United States Patent
Smaldone et al.

(10) Patent No.: US 10,462,070 B1
(45) Date of Patent: Oct. 29, 2019

(54) SERVICE LEVEL BASED PRIORITY SCHEDULER FOR MULTI-TENANCY COMPUTING SYSTEMS

(71) Applicant: EMC Corporation, Hopkinton, MA (US)

(72) Inventors: Stephen Smaldone, Woodstock, CT (US); Ian Wigmore, Westborough, MA (US); Felix Shvaiger, Brighton, MA (US); Arieh Don, Newton, MA (US); Gabi Benhanokh, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 322 days.

(21) Appl. No.: 15/198,284

(22) Filed: Jun. 30, 2016

(51) Int. Cl.
*H04L 12/927* (2013.01)
*H04L 12/911* (2013.01)
*H04L 12/833* (2013.01)
*H04L 12/851* (2013.01)
*H04L 12/24* (2006.01)

(52) U.S. Cl.
CPC ............ *H04L 47/805* (2013.01); *H04L 41/22* (2013.01); *H04L 41/5022* (2013.01); *H04L 47/2433* (2013.01); *H04L 47/2458* (2013.01); *H04L 47/821* (2013.01)

(58) Field of Classification Search
CPC ............ H04L 47/805; H04L 47/2433; H04L 47/2458; H04L 47/821; H04L 41/22; H04L 41/5022
USPC ......................................................... 709/226
See application file for complete search history.

(56) References Cited

U.S. PATENT DOCUMENTS

| | | | |
|---|---|---|---|
| 2005/0071450 A1* | 3/2005 | Allen | H04L 29/06 709/223 |
| 2006/0155633 A1* | 7/2006 | Fellenstein | G06Q 10/06 705/37 |
| 2009/0089786 A1* | 4/2009 | Saen | G06F 9/4818 718/103 |
| 2012/0079492 A1* | 3/2012 | Chambliss | G06F 9/5083 718/104 |
| 2012/0096470 A1* | 4/2012 | Bartfai-Walcott | G06F 9/4881 718/103 |
| 2012/0290789 A1* | 11/2012 | Susarla | H04L 41/5022 711/118 |
| 2013/0042253 A1* | 2/2013 | Yagi | H04L 41/5019 718/104 |
| 2013/0283097 A1* | 10/2013 | Chen | G06F 9/5027 714/16 |
| 2014/0075030 A1* | 3/2014 | Wang | G06F 9/50 709/226 |
| 2014/0181305 A1* | 6/2014 | Wolf | H04L 67/10 709/226 |
| 2014/0201738 A1* | 7/2014 | Choi | G06F 9/45533 718/1 |

(Continued)

*Primary Examiner* — James E Springer
(74) *Attorney, Agent, or Firm* — Workman Nydegger

(57) ABSTRACT

Systems and methods for scheduling multiple flows in a computing system or for allocating resources to the flows in the computing system. Each flow may be associated with a target priority and a target performance. A current priority can be determined for each flow and resources are allocated based on the highest current priority. Over time, the current priorities change and each flow will receive resources as the flows are scheduled for execution. No flow is starved of resources.

15 Claims, 4 Drawing Sheets

(56) References Cited

U.S. PATENT DOCUMENTS

| | | | |
|---|---|---|---|
| 2014/0207740 A1* | 7/2014 | Narasayya | G06F 17/30501 707/688 |
| 2014/0215590 A1* | 7/2014 | Brand | H04L 67/1097 726/6 |
| 2014/0280970 A1* | 9/2014 | Pijewski | H04L 41/0896 709/226 |
| 2014/0359113 A1* | 12/2014 | Krebs | H04L 41/5009 709/224 |
| 2015/0172206 A1* | 6/2015 | Anderson | H04L 47/70 709/226 |
| 2017/0052826 A1* | 2/2017 | Sasaki | G06F 9/5083 |
| 2017/0163554 A1* | 6/2017 | Das | H04L 47/72 |
| 2017/0300359 A1* | 10/2017 | Kollur | G06F 9/4881 |

\* cited by examiner

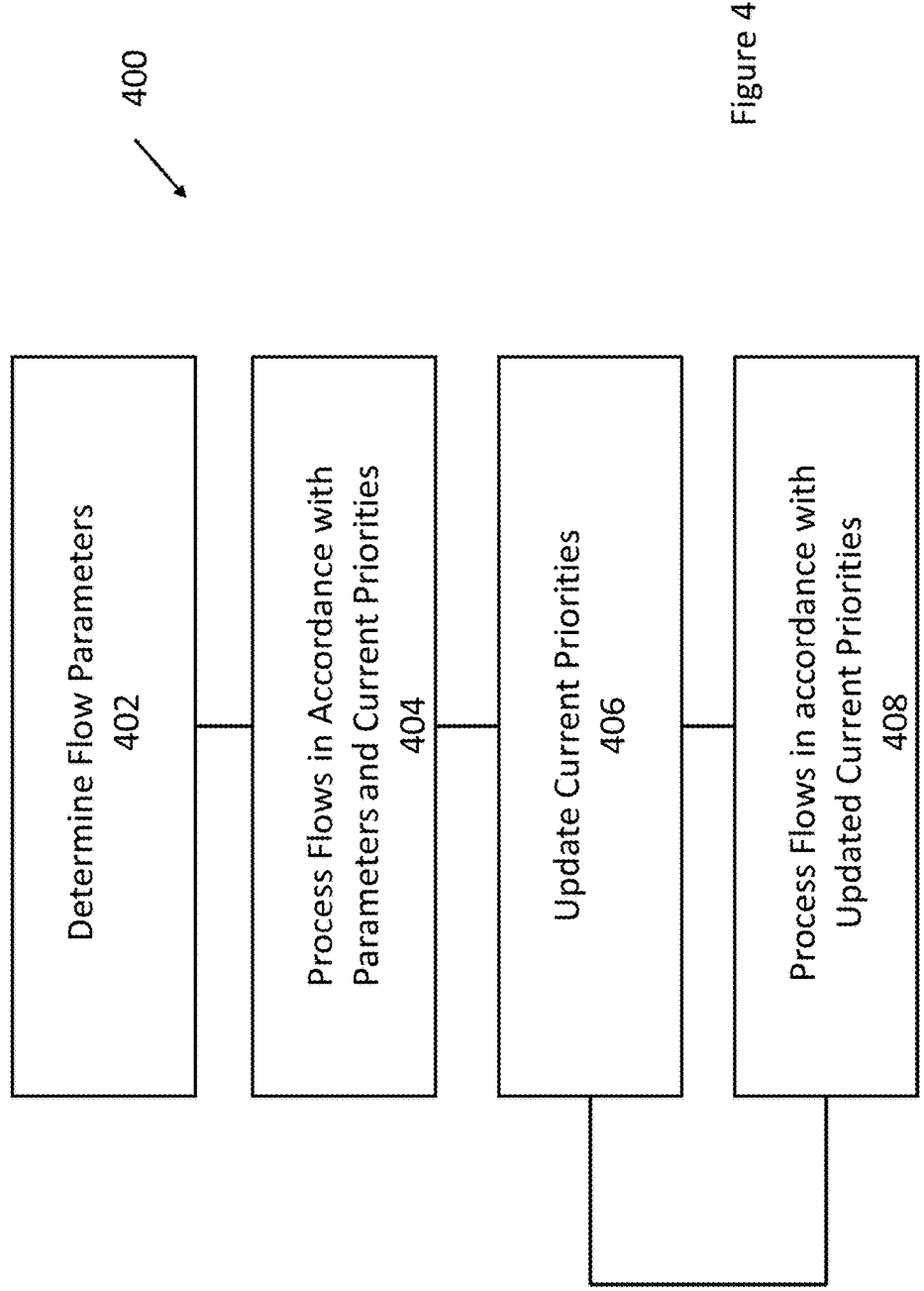

SERVICE LEVEL BASED PRIORITY SCHEDULER FOR MULTI-TENANCY COMPUTING SYSTEMS

FIELD OF THE INVENTION

Embodiments of the invention relate to systems and methods for scheduling processes. More particularly, embodiments of the invention relate to systems and methods for scheduling multiple flows in a computing system.

BACKGROUND

Service Providers (SPs) often charge customers (tenants) based upon offered Service Levels (SLOs). Some service providers allow for multiple tenants. These tenants can be associated with the same entity or with different entities. Each of the tenants is often associated with a quota. For example, in a computing system that provides backup services, each tenant may be allocated a certain amount of storage. The quota of storage may be hard or variable. End-user administrators may sub-divide their allocated resource amongst configurable objects (e.g., Mtrees).

For each object, an end user is conventionally required to specify very fine-grained metrics (i.e. maximum number of backup streams, maximum throughput) for each of their objects. Under this schema, a number of problems are introduced by the complexities of assigning the correct metrics to each object. For example, a SP must match a high-level SLO goal to fine-grained resource allocations and an end-user administrator must perform a similar task at the object level. This process is further complicated by the fact that workloads are not stable and tend to vary over time. In addition, a hard quota schema does not allow for overprovisioning of resources.

Conventional approaches to scheduling are too fine-grained and require users to enact policies at too low of a level. The ability to ensure that objects receive sufficient resources to satisfy the requirements of the service provider and the end user is difficult to achieve. Systems and methods are needed to simplify the process of scheduling processes or flows in a computing system.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 4 illustrates an example of a method for scheduling flows in a computing system.

DETAILED DESCRIPTION OF SOME EXAMPLE EMBODIMENTS

Embodiments of the invention relate to systems and methods for scheduling processes in a computing system. Embodiments of the invention allows administrators and users or clients to review the need for resources in high level terms and relative priorities. Embodiments of the invention can handle overprovisioning scenarios and dynamically allocate resources to ensure that service level objectives (SLOs) are being satisfied.

Figure 1:
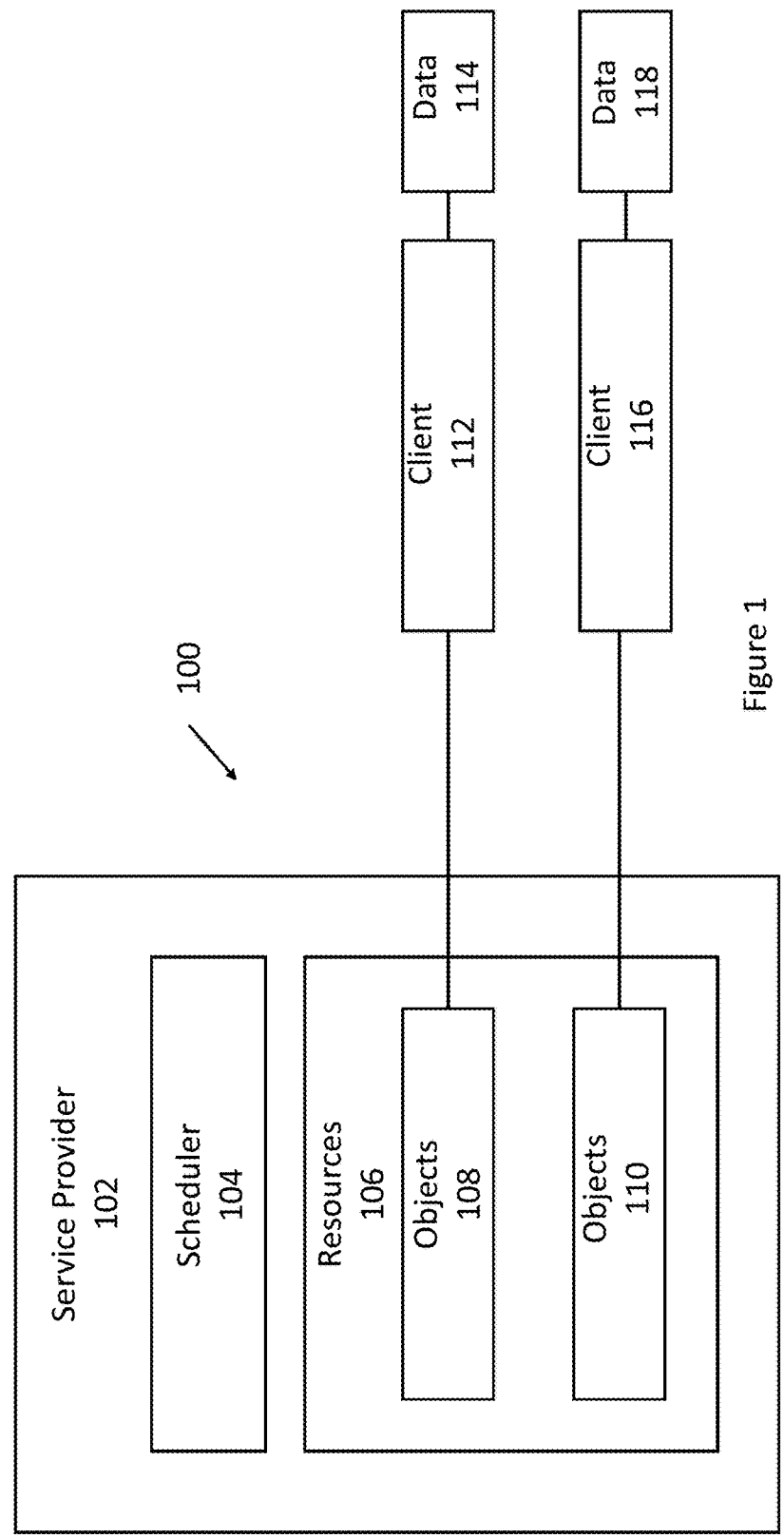
FIG. 1 illustrates an example of a computing system that includes a scheduler for scheduling flows in the computing system.

FIG. 1 illustrates an example of a computing system that schedules flows associated with clients. A flow is an example of a process or of tasks performed in the context of an application or a computing system or service.

FIG. 1 illustrates a service provider 102. The service provider 102 may be a computing system configured to provide a service such as backup, email, database, document management, or the like. The service provider 102 includes resources 106 such as memory, processors, network interface, or the like. The resources 106 are allocated to clients, represented by clients 112 and 116. In this example, each of the objects may be associated with a process or flow.

The objects 108 correspond to some of the resources allocated to the client 112 and the objects 110 correspond to the resources allocated to the client 116. When the service provider 102 provides backup services, the objects 108 and 110 are stored on storage associated with the service provider 102. More specifically, the service provider 102 may provide backup services and the data 114 and the data 118 are backed up in the resources 106. In particular, the objects 108 may include storage for the data 114. The objects 108 may be organized as Mtrees for example. Thus, the objects 108 may include multiple MTrees or multiple backups or the like. Each MTree or each of the objects 108 or 110 may be associated with a flow. A flow can similarly be associated with other computing services in addition to backup services. Thus, each of the objects 108 and 110 may be associated with a flow. In one example, a flow is a process that is performing one or more related tasks. Thus, each of the clients 112 and 116 may be associated with multiple flows. A flow may include a single process, multiple processes, multiple data streams (e.g., backup streams), or the like or combination thereof.

The scheduler 104 is configured to determine the relative priorities of the flows associated with the objects 108 and 110. The scheduler 104 may be configured to allocate the resources of the service provider 102 in time blocks. Each time block may last for some amount of time that can be predetermined, set by default, or set by a user. Thus, the scheduler 104 continually or periodically evaluates the priorities of the flows or processes running in or associated with the service provider and the scheduler may cause the resources of the computing system to be reallocated based on the relative priorities of the flows.

The scheduler 104 may allocate resources that are needed to ensure that the flows achieve the necessary or desired performance. The scheduler 104 schedules the flows such that service level objectives associated with the objects can be satisfied. High level goals can be implemented as low level quality of service goals and constraints. The flows can be scheduled automatically such that flows in need of resources to achieve their target performance can receive those resources. The scheduler can determine priority levels for each of the flows and allocate resources based on the relative priority levels. This allows the scheduler to allocate a pool of common resources to multiple flows and to adjust the resources allocated to specific flows as the priorities of the flows change.

In one example, the priority of a flow can change over time. Generally, the current priority of a flow may depend on a comparison of a target performance relative to a current performance. When the current performance exceeds the target performance, the priority of the flow may drop. When the current performance does not exceed the target performance, the priority will increase. By applying a similar analysis to all of the flows, embodiments of the invention ensure that none of the flows are perpetually ignored. At some point, the priority of a flow will rise sufficiently so that it receives the resources that are required.

Embodiments of the invention can continually or periodically evaluate the flows to determine their current priority. In one example, the current priority is related to or can be determined from the target priority, the target performance, and current performance of the flow. The current priority of the flows that are being processed or that are being scheduled for the next scheduling interval can change over time. Because the current priorities change, different flows may have the highest priority. For example, the scheduler may evaluate the priorities of all flows in order to allocate resources for the next scheduling block based on the relative priorities of the flows.

In one example, flows with the highest priority are given priority access to or a larger portion of the available resources. Over time, the priority of a flow that is not being sufficiently serviced (e.g., current performance is less than the target performance) will increase. In one example, the priority of a flow increases the more it falls behind its target performance. As a result, the priority of the flow increases until it has sufficient priority to obtain the necessary resources. Once the flow has received resources, the priority begins to drop. Ultimately, another flow will have the highest priority. Advantageously, the starvation of any particular flow is prevented because its priority will rise at some point.

In one example, an end user may provide certain parameters for a given flow or for a given object. These parameters will be used by a scheduler to measure the current priority of the flow. The parameters provided by the end user may include a target priority, a target performance, and an excess priority. These parameters are high level parameters that allow the goals of a user to be accomplished. These parameters can be converted to low level goals. For example, a user may be asked to identify the performance requirements/targets for an application. This may include, in the context of a backup application, the time required to complete the backup. Once the time is specified, other low level aspects of the flow can be determined. For example, a performance backup rate can be determined by dividing the amount of data to be backed up by the time specified time. This can be evaluated to determine how many backup streams to use and which resources may be necessary to achieve the high level goal of the user.

The user may also be asked how urgent it is to achieve the performance targets. This may give some flexibility when scheduling the flows. The user may also be asked to specify the priority after the target performance has been satisfied.

The target priority can be determined by an end user. For example, critical data may require more frequent backups within certain time period or require that the data be backed up in a specified time. The flows associated with the critical data may be assigned a relatively higher priority. Less critical data that does not need to be backed up as often or as quickly can be assigned a lower priority. The end user may also be able to specify a target performance. The target performance may depend on the type of service being provided. The target performance for a flow associated with a backup operation may be specified in terms of time (hr), data/time (e.g., Gb/hour), or the like.

For example, assume that a first flow has a target priority of 100 (which may be assigned by an end user) and a target performance of backing up data at a rate of 3 Gigabytes per hour. Assume that a second flow has a target priority of 60 and a target performance of 2 Gigabytes per hour. At a given time, both flows are executing and the first flow is scheduled to run because it has higher priority. The current priority of the flows is reevaluated over time and the flow with the highest priority is scheduled for the next schedule time or block. Thus, resources are allocated to the flow that has the highest priority. The amount of resources assigned to the flow with the highest priority for the next scheduling block may depend on how far below the target performance the flow is, or the like. Alternatively, all resources can be allocated to the highest priority flow for a given scheduling block.

When the current performance of the first flow is measured, it is determined that the current performance is 4 Gigabytes per hour for the first flow. As a result and when the target performance is 3 Gigabytes per hour, the current priority=$100*(3/4)=75$. It is also determined that the second flow has a current performance of 1 Gigabyte per hour. As a result and when the target performance is 2 Gigabytes per hour, the current priority $=60*(2/1)=120$. As a result, the second flow is given priority to the resources in the computing system (e.g., of the service provider). In one example, both flows may still be operating, by the current priority determines which flow is given priority to the resources of the service provider. This may include allocating more processing resources to the higher priority flow, more memory, more ports, or the like or combination thereof.

Figure 2:
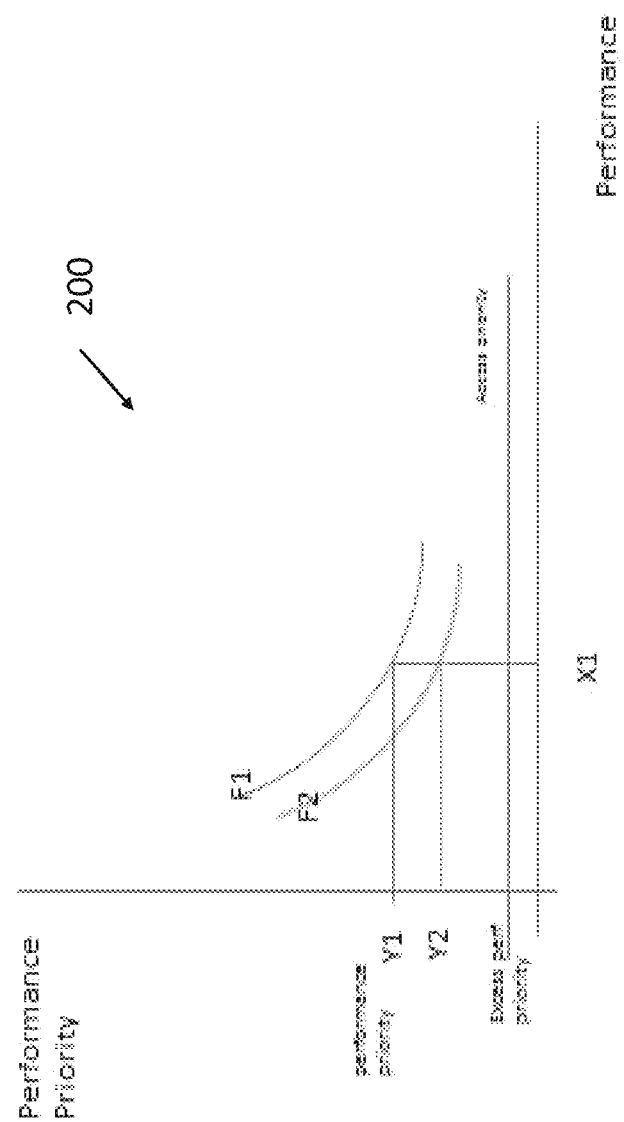
FIG. 2 illustrates an example of a graph that illustrates a relationship between performance and performance priority.

FIG. 2 illustrates a graph that relates performance to performance priority. The graph 200 can be used to help a user define the required behavior. The graph 200 illustrates a flow F1 and a flow F2. The graph 200 illustrates that for a performance point X1, the flow F1 needs to have a higher priority Y1 than a corresponding priority for the flow F2 at the same point X1. The graph 200 also illustrates an excess performance priority. The graph 200 may help an end user set relative priorities for different flows. Stated differently, the graph 200 shows that if the flows F1 and F2 are expected to have the same performance X1, it may be necessary to give the flow F1 a higher priority Y1 than the priority Y2 of the flow F2.

Figure 3:
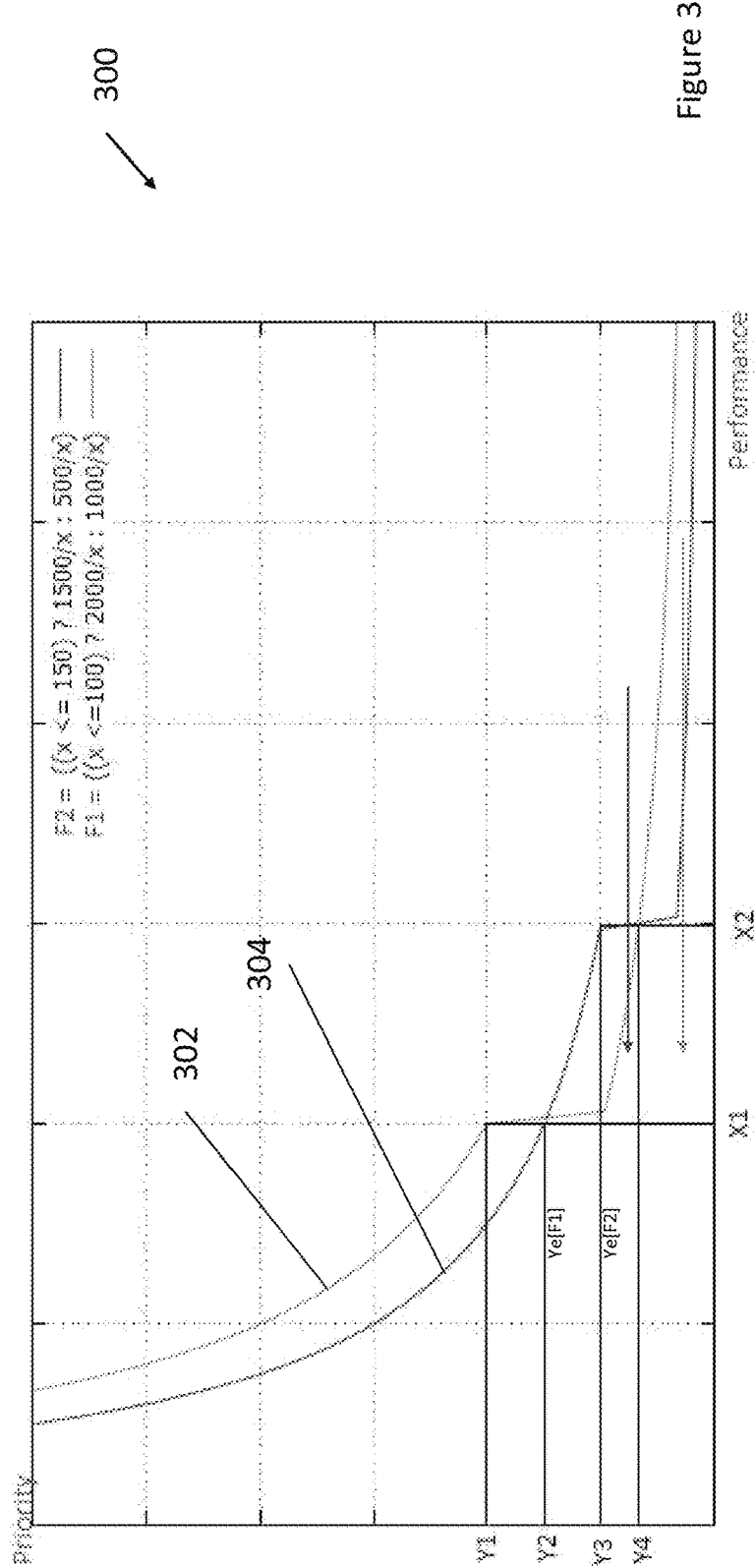
FIG. 3 illustrates and example of a graph that illustrates a relationship between performance and performance priority for multiple flows.

FIG. 3 illustrates a similar graph and illustrates changes to the current priorities of different flows. FIG. 3 illustrates that the target priority of a flow may drop to when the target performance has been achieved. Assume all processes or flows Fn start at time point Ti. Over time, the performances of the flows change and the performances of the flows are measured by the scheduler.

In one embodiment, all processes run on a shared set of computing resources and are managed by the scheduler. Periodically, the scheduler will be required to determine which process should run during the next scheduling interval. The scheduler will do that by determining the highest-priority process or flow among all those that are ready to run.

The formula to calculate the current priority of each process is dependent on whether the performance goals for this process have been achieved until now. If the performance goal has not been met or—If "current performance<Target performance" then the formula for the formulas (curves 302 and 304 of FIG. 3) is:

Current priority[Fi]=target priority[Fi]*target performance[Fi]/current performance[Fi];

From the graph 200 in FIG. 2, the (F1) priority to achieve the performance point X1 (common to both F1 and F2) is Y1, In the graph 200, see that Y1>Y2. As previously stated, the client typically supplies the target performance and the target priority that are needed to achieve the target performance.

If current performance >=Target performance, then the target performance has been achieved and it is now optional to keep on processing tasks for this process. That is Current priority[Fi]=excess priority[Fi]*target performance[Fi]/ current performance[Fi]. In one example, the client defines the excess priority. When the current performance exceeds the target performance, the current priority can be defined in terms of the excess priority.

Allowing the client to define the performance and priority of processes or flows allows the client to define the process's impact using client defined priorities. The overall load is normalized to make sure all tasks and processes are sharing the same processing power pool and may be described on the same graph in one example.

FIG. 3 illustrates that when the target performance is met, the priority may drop. For example, the flow 302 may satisfy its target performance at X1. At this point, the priority is dropped to a new a different priority. As illustrated in FIG. 3, at or near X1, the priority of the flow 304 increases and the flow 304 is given access to the resources of the service provider. This may occur until the target performance is met at X2. At X2 in FIG. 3, which is associated with the priority Y3, the priority of the flow 304 drops, thus allowing the flow 302 to again have a higher priority.

As shown in the graph 300, once the flow 302 achieves the target performance X1, its priority begins dropping until the priority of flow 304 is higher. At this point, the flow 304 is given priority access to the resources of the service provider or of the computing system. Similarly, once the target performance X2 is achieved for the flow 304, its priority begins dropping and goes below the priority of the flow 302, which is again given priority access to the resources. This illustrates that the priorities of the flows can change over time. The graph 300 is an example and other graphs may be distinct at least because the current priorities of the flows can vary over time. Thus, different flows have access to the resources of the computing system even if the target performance has not yet been achieved.

As previously stated, however, when the target performance has not been met or satisfied, the current priority can be evaluated or determined periodically. The current priority of other flows may also be determined. This allows the resources to be allocated to the flow that has the highest current priority during the next scheduling block. Flows that have met their target performance are usually associated with a second priority. However, these flows can also be evaluated in the context of allocating resources.

FIG. 4 illustrates an example of a method for allocating resources in a computing system. The method 400 may begin by determining parameters associated with a flow in box 402. This may be achieved by receiving input through a user interface such as a web page or the like. The parameters may include a performance target (e.g., time, rate, or the like). Often, the user interface identifies the type of parameter. For example, the interface may present the user with a box that identifies the time allowed to complete the backup or the like. Other information such as data rate, number of data streams, etc., may be derived from this input. The user interface may allow a user to specify an urgency. For example, whether the performance target is critical and must be accomplished or whether the performance target must only be satisfied if another flow is not more critical. This may be reflected, for example, by setting a priority level. By setting the priority level of one flow higher than another flow, the service provider will automatically focus on the higher priority flow. The user may be allowed to set a priority once the target performance has been satisfied. This effectively allows the priority to be lowered such that the resources can be allocated to flows of lower priority once the target performance is satisfied.

In box 404, the flows are handled in accordance with their current priority. More specifically, the flows are allocated resources for the current scheduling block based on their current priorities. The current priorities, as previously described, may be determined from the parameters.

In box 406, the current priorities of the flows are updated. In one example, the current priorities are calculated as the scheduler prepares for the next scheduling block or next time period. In box 408, the flows are allocated resources for the scheduling block based on their updated current priorities. As the flows change, achieve target performances, etc., the priorities change and all flows will receive resources. This process of updating the priorities and scheduling for the next block are repeated as necessary.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, DRAM, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. A controller may include a processor and memory and/or other computing chips.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for allocating resources in a computing system providing a computing service to one or more clients, the method comprising:
   receiving parameters from the one or more clients for multiple flows associated with the one or more clients, the parameters including at least a target priority and a target performance for each of the multiple flows;
   for each of the multiple flows, converting the target performance into a measurable characteristic and determining a current performance based on the measurable characteristic;
   determining a current priority for each of the multiple flows executing in the computing system, wherein the current priority is based on the target priority, the target performance and the current performance;
   scheduling the multiple flows for a schedule block based on the current priorities, wherein each schedule block corresponds to a predetermined period of time;
   allocating resources to the multiple flows based on relative current priorities of the multiple flows for the schedule block;
   updating the current priority of each of the multiple flows for a next schedule block; and
   reallocating the resources to the multiple flows for the next schedule block based on the relative updated current priorities.

2. The method of claim 1, wherein the target priority comprises a number and wherein the target performance comprises a time period or a rate.

3. The method of claim 1, further comprising determining the current priority for each flow by:
   multiplying the target priority of the flow by a ratio of the target performance to the current performance.

4. The method of claim 1, wherein the one or more parameters of each of the multiple flows further include an excess priority and a second priority, wherein the second priority is associated with achieving the target performance.

5. The method of claim 4, wherein, when the current performance is greater than or equal to a target performance, the current priority of a flow is equal to the excess priority multiplied by a ratio of the target performance to the current performance.

6. A method of scheduling flows in a computing environment, the method comprising:
   providing storage to multiple tenants in a computing system configured to provide a computing service to the tenants, wherein the storage of each tenant is associated with a storage quota, wherein each entity is associated with multiple objects and each object is associated with a flow;
   receiving parameters from the tenants in for the flows associated with the tenants, the parameters including at least a target priority and a target performance for each of the flows;
   determining a current performance for each of the flows by converting the target performance into a measurable characteristic;
   determining a current priority for each flow executing in the computing system based on the target performance;
   scheduling the flows for a schedule block based on the current priorities, wherein each schedule block corresponds to a predetermined period of time and wherein the flow with the highest priority is given priority access to resources of the computing system for the schedule block;
   for a next schedule block, updating the current priorities of the flows and giving prioritized access to the resources to the flow with the highest updated current priority during the next schedule block.

7. The method of claim 6, further comprising determining the current priority, when a current performance is less than a target performance by multiplying a target priority by a ratio of a target performance to a current performance.

8. The method of claim 7, further comprising determining, when the current performance is greater than or equal to the target performance, by multiplying an excess priority by the ratio of the target performance to the current performance.

9. The method of claim 6, wherein the computing service include backup services.

10. The method of claim 9, wherein each flow comprises a process associated with a backup operation.

11. The method of claim 6, further comprising receiving parameters through a user interface, the parameters including a target priority, a target performance, and an excess priority.

12. The method of claim 6, wherein the current priority of a flow increases the further away the current performance is from the target performance.

13. The method of claim 6, wherein the resources include processor resources.

14. A computing system configured to provide a computing service to one or more clients, wherein each client is associated with one or more objects, the computing system comprising:
- a storage device, wherein the objects are stored in the storage;
- computing resources including at least processing resources; and
- a scheduler that includes computer executable instructions that, when executed, perform a method for scheduling flows associated with the objects, the method comprising:
- receiving parameters from the one or more clients for multiple flows associated with the one or more clients, the parameters including at least a target priority and a target performance for each of the multiple flows;
- for each of the multiple flows, determining a current performance by converting the target performance into a measurable characteristic;
- determining a current priority for each of the flows executing in the computing system, wherein the current priority is based on the target priority, the target performance and a current performance when the current performance is less than the target performance and wherein the current priority is based on an excess priority, the target performance and the current performance when the current performance is equal to or greater than the target performance;
- scheduling the multiple flows for a schedule block based on the current priorities, wherein each schedule block corresponds to a predetermined period of time;
- allocating resources to the multiple flows based on relative current priorities of the multiple flows for the schedule block;
- updating the current priority of each of the multiple flows for a next schedule block; and
- reallocating the resources to the multiple flows for the next schedule block based on the relative updated current priorities.

15. The computing system of claim 14, further comprising presenting a graph to a user to aid in setting the target priority and the target performance.

* * * * *